United States Patent
Yap (10) Patent No.: US 9,187,144 B2
(45) Date of Patent: Nov. 17, 2015

(54) FOLDING SCOOTER

(71) Applicant: Fook Fah Yap, Singapore (SG)

(72) Inventor: Fook Fah Yap, Singapore (SG)

(*) Notice: Subject to any disclaimer, the term of this patent is extended or adjusted under 35 U.S.C. 154(b) by 0 days.

(21) Appl. No.: 14/259,538

(22) Filed: Apr. 23, 2014

(65) Prior Publication Data

US 2015/0266536 A1    Sep. 24, 2015

Related U.S. Application Data

(60) Provisional application No. 61/968,623, filed on Mar. 21, 2014.

(51) Int. Cl.
   *B62M 1/00* (2010.01)
   *B62K 15/00* (2006.01)
   *B62K 3/00* (2006.01)

(52) U.S. Cl.
   CPC .............. *B62K 15/008* (2013.01); *B62K 3/002* (2013.01)

(58) Field of Classification Search
   CPC ..... B62K 3/002; B62K 15/006; B62K 15/008
   USPC ................ 180/181; 280/87.041, 87.05, 47.18
   See application file for complete search history.

(56) References Cited

U.S. PATENT DOCUMENTS

| | | | | |
|---|---|---|---|---|
| 4,718,688 A * | 1/1988 | Sanders | ......................... | 280/278 |
| 4,895,386 A * | 1/1990 | Hellestam et al. | ............ | 280/287 |
| 5,836,602 A * | 11/1998 | Wang | ............................ | 280/287 |
| 6,336,649 B1 * | 1/2002 | Lin | ............................... | 280/278 |
| 6,364,335 B1 * | 4/2002 | Mombelli | ..................... | 280/287 |
| 6,616,154 B1 * | 9/2003 | Neuhold | ..................... | 280/87.05 |
| 6,641,159 B1 * | 11/2003 | Fan | ............................... | 280/278 |
| 6,799,771 B2 * | 10/2004 | Bigot | ............................ | 280/278 |
| 6,986,522 B2 * | 1/2006 | Sinclair et al. | ................. | 280/287 |
| 7,651,109 B2 * | 1/2010 | Tong | ............................. | 280/278 |
| 8,162,090 B2 * | 4/2012 | Atherton et al. | .............. | 180/208 |
| 8,162,345 B1 * | 4/2012 | Szu-Yao | ....................... | 280/287 |
| 8,205,902 B2 * | 6/2012 | Uimonen et al. | ............. | 280/278 |

(Continued)

FOREIGN PATENT DOCUMENTS

EP     0026800 B1    5/1984
EP     0505598 A1    9/1992

(Continued)

OTHER PUBLICATIONS

Jango bikes website: www.jangobikes.com, Apr. 22, 2014.

(Continued)

*Primary Examiner* — Hau Phan
*Assistant Examiner* — Jacob Meyer
(74) *Attorney, Agent, or Firm* — MP Patents, LLC (57) ABSTRACT

A vehicle configured for conversion between expanded and folded arrangements, includes a front frame assembly, a front wheel and a rear wheel assembly having a rear wheel carrier and a rear wheel coupled with the rear wheel carrier. A central frame assembly extends between the front frame assembly and the rear wheel assembly. A forward hinge coupling enables relative pivoting of the front frame assembly and the central frame assembly about a front frame pivot axis extending at an acute angle relative to a rear vertical transverse plane and at an acute angle relative to a horizontal plane orthogonal to both a rear vertical longitudinal plane and the rear vertical transverse plane. A rearward hinge coupling enables relative pivoting of the central frame assembly and the rear wheel assembly.

18 Claims, 8 Drawing Sheets

(56) References Cited

U.S. PATENT DOCUMENTS

| | | | |
|---|---|---|---|
| 8,430,414 B1* | 4/2013 | Yap | 280/278 |
| 8,465,033 B2* | 6/2013 | Benarrouch | 280/87.05 |
| 8,505,937 B2* | 8/2013 | Epstein | 280/87.041 |
| 8,613,458 B2* | 12/2013 | Ghisolfi et al. | 280/87.05 |
| 8,720,918 B2* | 5/2014 | Liao | 280/87.05 |
| 8,894,084 B1* | 11/2014 | Yap | 280/278 |
| 2002/0089137 A1* | 7/2002 | Chang et al. | 280/87.041 |
| 2007/0013162 A1* | 1/2007 | Whyte | 280/278 |
| 2007/0210556 A1* | 9/2007 | Hon et al. | 280/287 |
| 2010/0044137 A1* | 2/2010 | Atherton et al. | 180/223 |
| 2012/0018968 A1* | 1/2012 | Joslin et al. | 280/87.041 |
| 2012/0080859 A1* | 4/2012 | Tai | 280/87.041 |
| 2012/0104714 A1* | 5/2012 | Sapir | 280/87.05 |
| 2012/0256386 A1* | 10/2012 | Benarrouch | 280/87.05 |
| 2012/0292882 A1* | 11/2012 | Ghisolfi et al. | 280/287 |
| 2014/0008882 A1* | 1/2014 | Liao | 280/40 |

FOREIGN PATENT DOCUMENTS

| | | | |
|---|---|---|---|
| EP | 1600368 A2 | 4/2005 | |
| EP | 2492175 A1 | 2/2011 | |
| WO | 8605155 A1 | 9/1986 | |
| WO | 2004041631 A1 | 5/2004 | |

OTHER PUBLICATIONS

Mike Hanlon, GizMag website: www.gizmag.com/myway-compact-smallest-fold-up-electric-scooter/22475/, May 9, 2012.
Designbuzz, Design Buzz Website: www.designbuzz.com/7-foldable-scooters-smart-effortless-transportation/, Oct. 27, 2011.
StigoBike website: stigobike.com/, Apr. 3, 2014.
Antonio Pasolini, GizMag website: www.gizmag.com/jac-electric-scooter/25928/, Jan. 23, 2013.
Greenmuze, GreenMuze website: www.greemuze.com/climate/travel/1799-urban-scooter-fo-adults-.html/, Nov. 10, 2009.
Dahonbikes Website, May 8, 2013.
Pacific Cycles Website, May 8, 2013.
Birdy Bike Website, Jul. 24, 2013: http://www.birdybike.com.
Bickerton Website, Jul. 24, 2013: http://www.bickertonportables.co.uk.
Chris Burns, Aug. 13, 2013: 'Fold Your Saddle', Yanko Design—Form Beyond Function.

* cited by examiner

FOLDING SCOOTER

CROSS REFERENCE TO RELATED APPLICATIONS

This application claims the priority benefit of U.S. Provisional Application No. 61/968,623 filed on Mar. 21, 2014 which is incorporated herein by reference in its entirety.

BACKGROUND

Small, personal vehicles such as bicycles and scooters are popular both as recreational vehicles and means of transportation. When used as part of a commute employing multiple modes of transportation, personal vehicles which occupy a large space on buses or trains may be cumbersome and inconvenient. These vehicles may also be difficult to store at a user's workplace or residence when not in use. Personal vehicles having very small frames occupy less space but are too awkward for adult use. Meanwhile, personal vehicles having very small wheels also occupy less space but suffer from an uncomfortable ride due to the small wheel diameter.

SUMMARY

In an aspect of the disclosure, a scooter configured for conversion between expanded and folded arrangements, includes a front frame assembly including a neck and a head tube configured to receive a handlebar stem. A front wheel carrier is rotatably coupled with the head tube. A front wheel is coupled with the front wheel carrier and includes a circumference defining a front vertical longitudinal plane and an axle defining a front vertical transverse plane orthogonal to the front vertical longitudinal plane. A rear wheel assembly includes a rear wheel carrier and a rear wheel coupled with the rear wheel carrier and including a circumference defining a rear vertical longitudinal plane and an axle defining a rear vertical transverse plane orthogonal to the rear vertical longitudinal plane. A central frame assembly extends between the front frame assembly and the rear wheel assembly. A forward hinge coupling enables relative pivoting of the front frame assembly and the central frame assembly about a front frame pivot axis extending at an acute angle relative to the rear vertical transverse plane and at an acute angle relative to a horizontal plane orthogonal to both the rear vertical longitudinal and rear vertical transverse planes. A rearward hinge coupling enables relative pivoting of the central frame assembly and rear wheel assembly. A steering assembly is configured to enable steering of the front wheel and includes a handlebar and a handlebar stem having an upper portion configured for clamping to the handlebar and a lower portion configured for receipt within the head tube. A steering hinge of the steering assembly is configured to allow pivoting of the handlebar stem upper portion relative to the handlebar stem lower portion. An electric hub motor is operatively coupled with the rear wheel. In the folded arrangement of the scooter, the front vertical longitudinal plane and the rear vertical longitudinal plane are spaced apart and parallel.

In another aspect, a vehicle configured for conversion between expanded and folded arrangements, includes a front frame assembly having a neck and a head tube configured to receive a handlebar stem. A front wheel carrier is rotatably coupled with the head tube. A front wheel is coupled with the front wheel carrier and includes a circumference defining a front vertical longitudinal plane and an axle defining a front vertical transverse plane orthogonal to the front vertical longitudinal plane. A rear wheel assembly includes a rear wheel carrier and a rear wheel coupled with the rear wheel carrier. The rear wheel has a circumference defining a rear vertical longitudinal plane and an axle defining a rear vertical transverse plane orthogonal to the rear vertical longitudinal plane. A central frame assembly extends between the front frame assembly and the rear wheel assembly. A forward hinge coupling enables relative pivoting of the front frame assembly and the central frame assembly about a front frame pivot axis extending at an acute angle relative to the rear vertical transverse plane and at an acute angle relative to a horizontal plane orthogonal to both the rear vertical longitudinal and rear vertical transverse planes. A rearward hinge coupling enables relative pivoting of the central frame assembly and rear wheel assembly. The front vertical longitudinal plane and the rear vertical longitudinal plane are substantially coplanar with the vehicle in the expanded arrangement and the front wheel directed straight ahead yet are spaced apart and substantially parallel in the folded arrangement.

In yet another aspect of the disclosure, a vehicle is configured for conversion between expanded and folded arrangements and includes a front frame assembly including a neck extending from a forward hinge coupling to a head tube configured to receive a handlebar stem. A front wheel is coupled with the head tube through a front wheel carrier. A central frame assembly extends from the forward hinge coupling to a rearward hinge coupling. A rear wheel is coupled with the rearward hinge coupling through a rear wheel carrier. The forward hinge coupling enables downward pivoting of the central frame assembly relative to the front frame assembly when the front frame assembly is lifted upward. Furthermore, by the rearward hinge coupling, relative pivoting of the central frame assembly and rear wheel assembly is enabled about a rearward hinge pivot axis which is horizontal and transverse.

DETAILED DESCRIPTION

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

All illustrations of the drawings are for the purpose of describing selected examples embodying the present disclosure and are not intended to limit the scope.

An object of the present disclosure is to introduce a vehicle configured for conversion between an expanded arrangement and a folded arrangement. When storage in small spaces is desirable, the vehicle may be quickly folded into a compact package with a simple folding process. When unfolded into an expanded, riding arrangement, the vehicle has geometry that can be readily adjusted to fit adult users of most heights.

While such a vehicle in accordance with embodiments of the present disclosure may take any of a variety of forms, in one example, the vehicle takes the form of a scooter 100 configured for conversion between an expanded arrangement (FIGS. 1-6) and a folded arrangement (FIGS. 11-15). Scooter 100 includes a front frame assembly 130 with a neck 132 and a head tube 134 configured to receive a handlebar stem 112.

A front wheel assembly 120 is rotatably coupled with head tube 134 and includes a front wheel carrier 122 securely clamped to handlebar stem 112 and a front wheel 124 having a hub and an axle 125 central to a tire. Front wheel 124, which is rotatably coupled at axle 125 to front wheel carrier 122, has a circumference defining a front vertical longitudinal plane. Axle 125 defines a front vertical transverse plane orthogonal to the front vertical longitudinal plane.

A rear wheel assembly 150 includes a rear wheel carrier 152 and a rear wheel 154 having a hub and an axle 155 central to a tire. Rear wheel 154, which is rotatably coupled at axle 155 to rear wheel carrier 152, has a circumference defining a rear vertical longitudinal plane. Rear wheel 154 is thus also coupled with rearward hinge coupling 144 through rear wheel carrier 152. Axle 155 defines a rear vertical transverse plane orthogonal to the rear vertical longitudinal plane. An electric hub motor 156 is operatively coupled with rear wheel 154 to rotate the same for propelling scooter 100. In the straight-ahead, expanded riding configuration (FIGS. 1-6), the vertical longitudinal plane of rear wheel 154 is coplanar with the vertical longitudinal plane of front wheel 124.

A central frame assembly 140 extends between front frame assembly 130 at a forward hinge coupling 142 and rear wheel assembly 150 at a rearward hinge coupling 144 and includes a base frame 146 supporting a platform 148 for housing a motor controller and power source such as an electric battery (not visible). Base frame 146 and platform 148 both extend substantially in the fore and aft direction of scooter 100 generally between front frame assembly 130 and rear wheel assembly 150. At its front end, base frame 146 is coupled by forward hinge coupling 142 to neck 132 and, at its rear end, is coupled by rearward hinge coupling 144 to rear wheel carrier 152.

The central longitudinal axis of base frame 146 lies in the rear vertical longitudinal plane. In one embodiment, base frame 146 comprises two opposite, parallel or substantially parallel branches, bars or tubes spaced apart such that, during folding, folded rear wheel 154 may penetrate into the gap between branches of base frame 146 (FIGS. 7-15).

Figure 5:
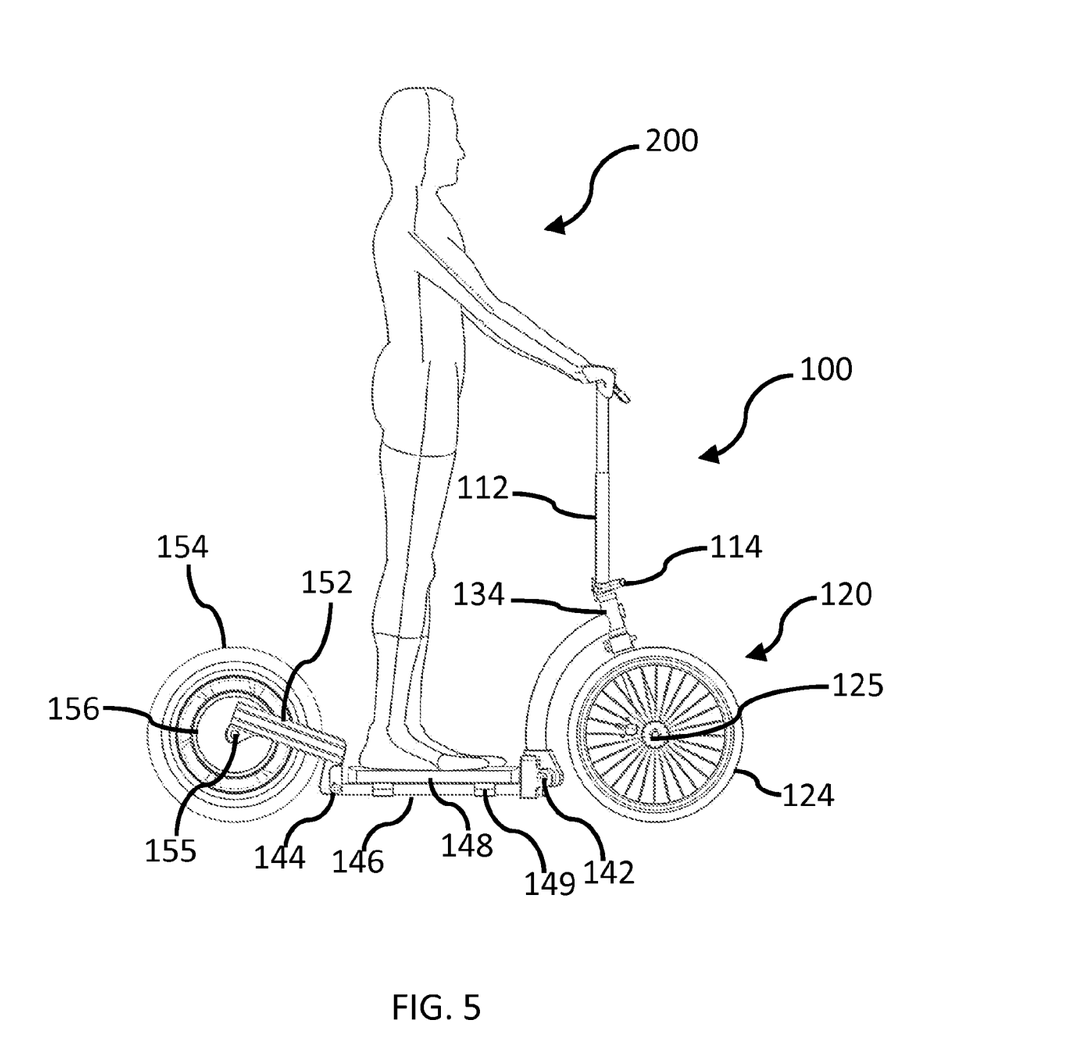
FIG. 5 illustrates a right side elevation view of the vehicle of FIGS. 1-4 in an expanded, riding configuration with a rider 200 steering a vehicle front wheel straight forward.
Figure 6:
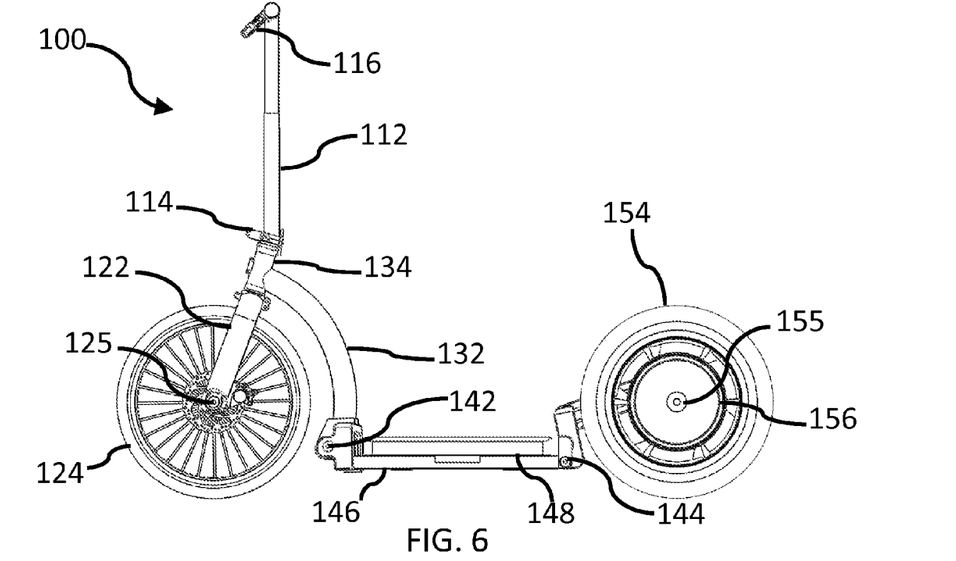
FIG. 6 illustrates a left side elevation view of the vehicle of FIGS. 1-5 in an expanded, riding configuration.
Figure 12:
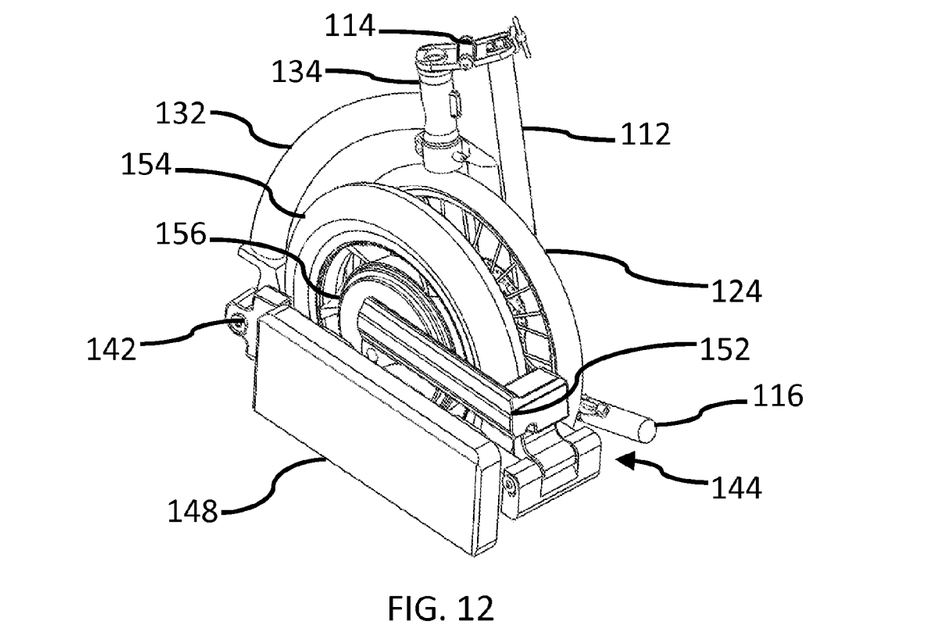
FIG. 12 illustrates a right side perspective view of a vehicle in an example fully folded arrangement.
Figure 13:
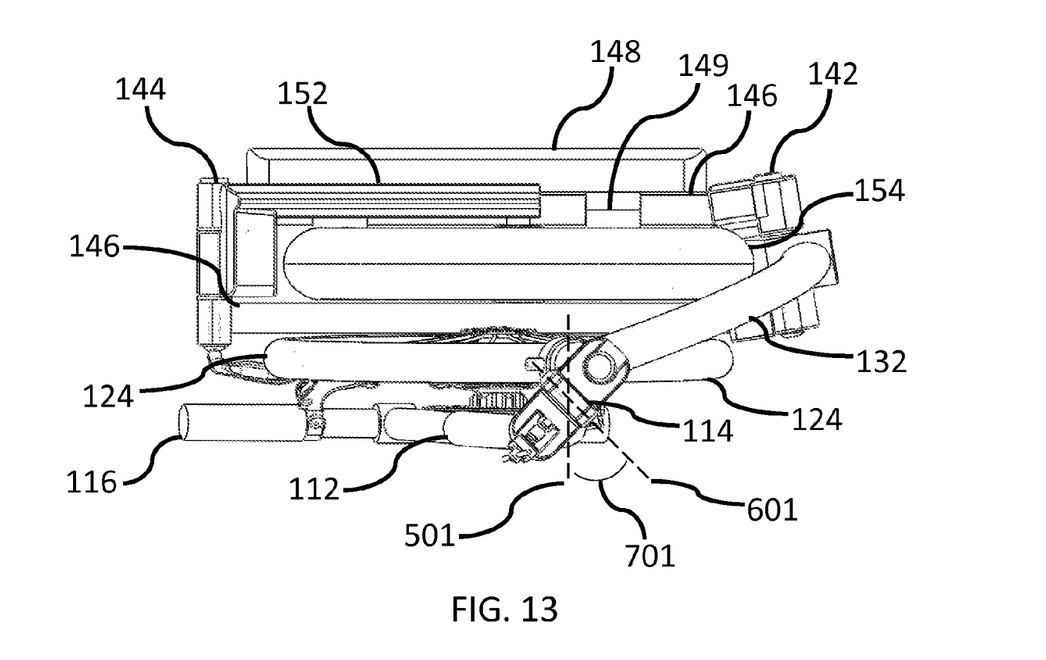
FIG. 13 illustrates a top view of a vehicle in an example fully folded arrangement.

Platform 148 is pivotably coupled to base frame 146 along one of two opposite branches of base frame 146 by a platform hinge 149 (FIGS. 5 & 13). The pivot axis of platform hinge 149 is substantially horizontal and parallel with the rear vertical longitudinal plane thereby allowing platform 148 to swivel about a horizontal, longitudinal axis by approximately 90 degrees. Referring to FIGS. 1-3 & 5, in the expanded arrangement, a top surface of platform 148 is substantially horizontal such that it is also substantially orthogonal to both the rear vertical transverse and rear vertical longitudinal planes. However, referring to FIGS. 12, 14 & 15, the top surface of platform 148 is substantially parallel with the rear vertical longitudinal plane when scooter 100 is in the folded arrangement.

Platform 148, supported by base frame 146 below it, may be a sturdy box formed of metal, plastic or composites having a top surface of sufficient area to allow an adult rider to stand thereon. As mentioned above, platform 148 may house an electric battery and motor controller to protects them from the environment.

Figure 1:
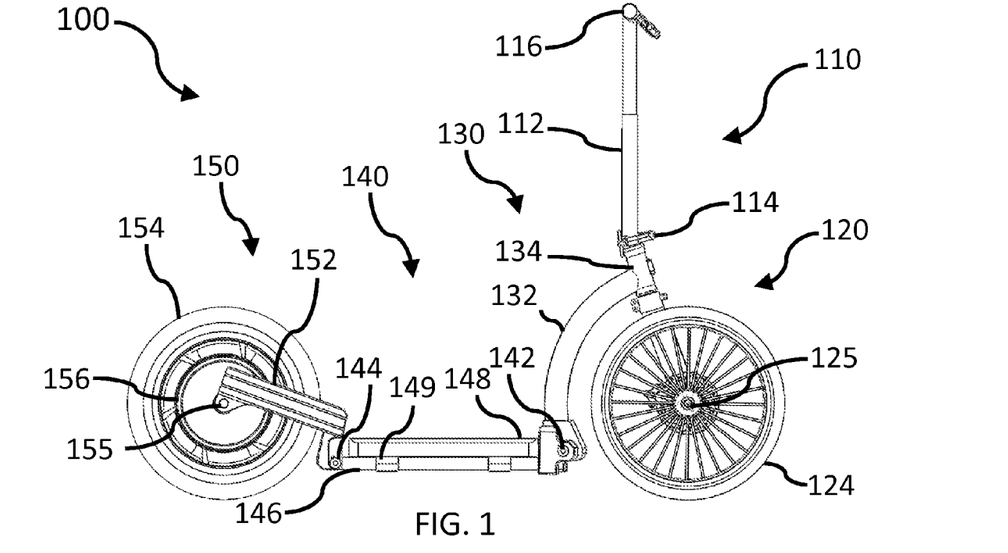
FIG. 1 illustrates a right side elevation view of an example vehicle in accordance with an embodiment of the disclosure.
Figure 2:
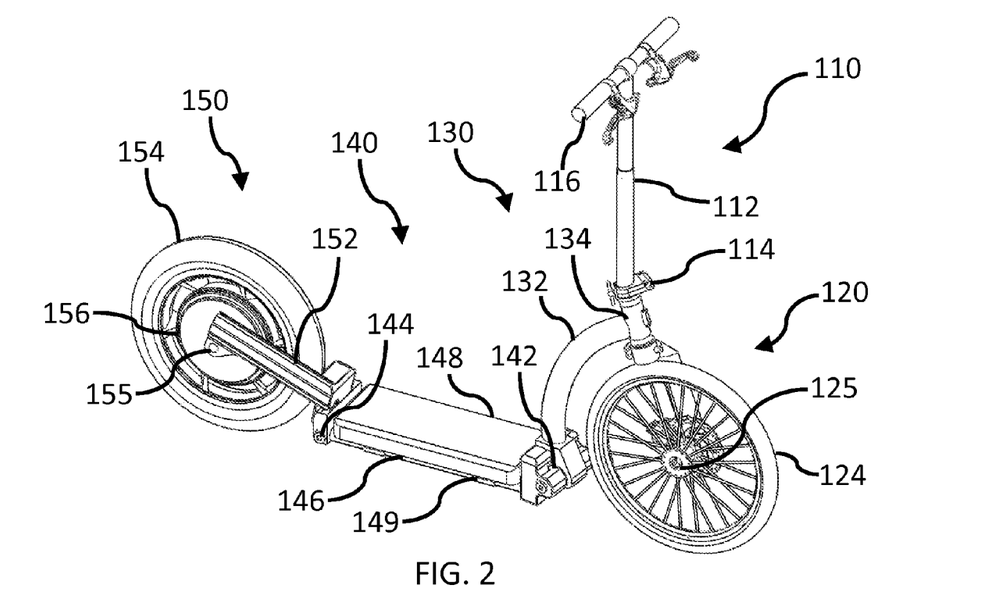
FIG. 2 illustrates a right side perspective view of the vehicle of FIG. 1.
Figure 3:
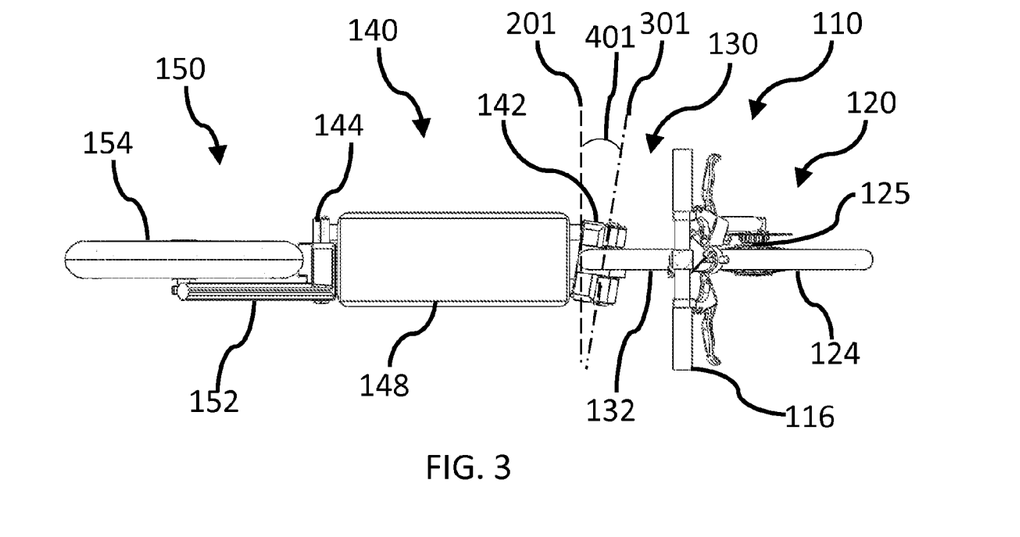
FIG. 3 illustrates a top view of the vehicle of FIGS. 1 & 2.
Figure 4:
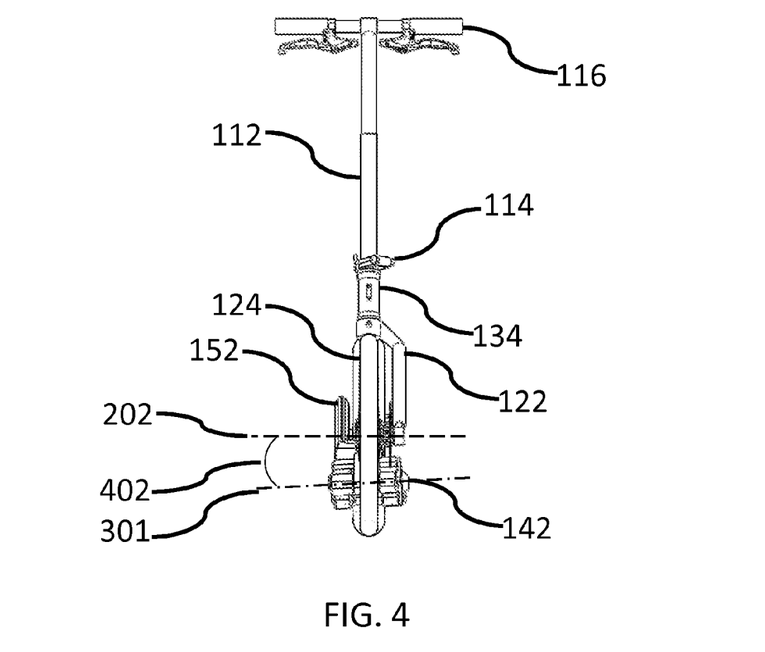
FIG. 4 illustrates a front view of the vehicle of FIGS. 1-3.

Forward hinge coupling 142 enables relative pivoting of front frame assembly 130 and central frame assembly 140 about a forward hinge coupling pivot axis 301 extending at an angle 401 relative to a transverse plane 201 and at an angle 402 relative to a horizontal plane 202 orthogonal to both the rear vertical longitudinal and rear vertical transverse planes (FIGS. 3 & 4). It should be noted that transverse plane 201 is parallel with the rear vertical transverse plane.

In some embodiments, angles 401 and 402 may be acute, for example, angle 401 may be approximately 10 degrees, while angle 402 may be approximately 5 degrees. Angles different from these may be suitable depending on width dimensions of various components of a vehicle and specific geometry. However, employing angle measurements suitable for enabling central frame assembly 140 to pivot to a position adjacent to front assembly 130 may be desirable in some examples.

Neck 132 of front frame assembly 130 extends substantially between forward hinge coupling 142 and head tube 134. During folding, forward hinge coupling 142 enables downward pivoting of central frame assembly 140 relative to front frame assembly 130 when front frame assembly 130 is lifted upward Rearward hinge coupling 144 enables relative pivoting of central frame assembly 140 and rear wheel assembly 150 about a pivot axis extending horizontally and parallel with the rear vertical transverse plane. As such, the rearward hinge coupling pivot axis also parallel with transverse plane 201.

With scooter 100 in the expanded arrangement and resting upright on a supporting surface, a force applied to central frame assembly 140 toward the supporting surface bolsters both forward hinge coupling 142 and rearward hinge coupling 144 against pivoting (FIG. 5).

Steering assembly 110 is configured to enable steering of front wheel 124 and includes a handlebar 116 and a handlebar stem 112. Handlebar stem 112 further includes an upper portion configured for clamping to handlebar 116 and a lower portion configured for rotatable receipt within head tube 134. Handlebar 116 generally extends substantially parallel with the front vertical transverse plane.

A steering hinge 114 allows pivoting of the handlebar stem upper portion relative to the handlebar stem lower portion about a pivot axis 601 extending at an acute angle 701 relative to front vertical transverse plane 501 (FIG. 13). In an example, the acute angle may measure approximately 45 degrees. However, other angles may also be suitable for allowing handlebar stem 112 and handlebar 116 to fold to a position adjacent to a side of front wheel 124.

The longitudinal axis of head tube 134 may extend within the vertical longitudinal plane and at an angle relative to the horizontal plane. In an example, this angle may measure between approximately 60 degrees and approximately 80 degrees.

While the front vertical longitudinal plane and the rear vertical longitudinal plane are substantially coplanar with scooter 100 in the expanded arrangement (FIGS. 1-6) as mentioned above, the front vertical longitudinal plane and the rear vertical longitudinal plane are spaced apart and parallel in the folded arrangement (FIGS. 11-14).

In an example embodiment, scooter 100 is driven by an electric motor housed in hub 156 of rear wheel 154. The motor may be powered by a battery and controller housed in platform 148. In an example, a user display unit and throttles (not shown) may be mounted on handlebar 116 and electric cables (not shown) can be routed along the body of scooter 100 either externally or internally from hub motor 156 and handlebar 116 to the motor controller in platform 148.

Scooter 100 is arranged such that, when it is in the operative riding configuration (FIGS. 1-6), it has dimensions that will fit adult riders of different stature. While pedals may be provided to some embodiments of a foldable vehicle, as a scooter 100, the vehicle is devoid of pedals configured to cause a rotation of either of wheels 124 or 154. Instead, scooter 100 is driven by a motor as mentioned above, or by a user 200 pushing off a supporting surface with one foot while standing on platform 148 with hands on handlebar 116 (FIG. 5) to control direction with steering assembly 110.

Locking means may be provided to prevent motion in forward hinge coupling 142 and rearward hinge coupling 144 in the operative riding position (FIGS. 1-6), the fully folded configuration (FIGS. 11-15), or both.

An example procedure for folding the scooter into a compact package for transport or storage involves one or more of the following actions.

In preliminary actions of a method for reconfiguring a vehicle such as a scooter between an operative, expanded arrangement and a folded arrangement, a reconfigurable vehicle is supplied. For example, a front frame assembly 130 is provided to include a neck 132 and a head tube 134 configured to receive a handlebar stem 112. A front wheel 124 may be coupled with head tube 134 and include a circumference defining a front vertical longitudinal plane and an axle 125 defining a front vertical transverse plane orthogonal to the front vertical longitudinal plane.

A rear wheel assembly 150 may be provided to include a rear wheel carrier 152 and a rear wheel 154 coupled with rear wheel carrier 152 and to further include a circumference defining a rear vertical longitudinal plane and an axle 155 defining a rear vertical transverse plane orthogonal to the rear vertical longitudinal plane.

A central frame assembly 140 may be provided to extend between front frame assembly 130 and rear wheel assembly 150.

A forward hinge coupling 142 is provided to enable relative pivoting of front frame assembly 130 and central frame assembly 140 while a rearward hinge coupling 144 is provided to enable relative pivoting of central frame assembly 140 and rear wheel assembly 150.

With reconfigurable scooter 100 manufactured, constructed, assembled or otherwise provided, rearward hinge coupling 144 may be unfastened from a locked state in which rear wheel assembly 152 is secured against pivoting relative to central frame assembly 140.

Figure 7:
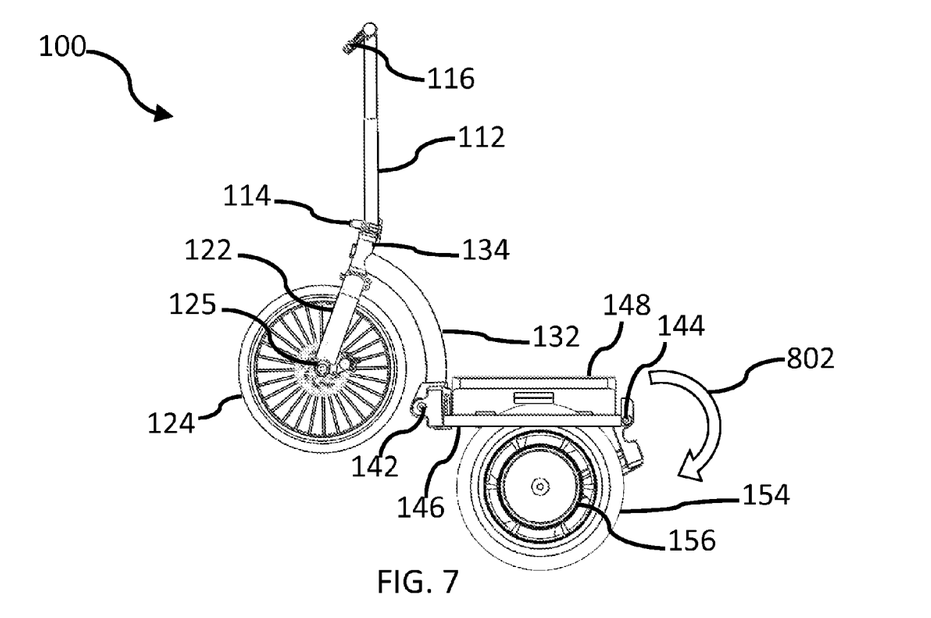
FIG. 7 illustrates a left side view of an example folding action of a vehicle in which a rear wheel assembly pivots downward and forward toward a central frame assembly.

With rearward hinge coupling 144 unfastened to allow relative pivoting of central frame assembly 140 and rear wheel assembly 150, scooter 100 is lifted upward, for example with two hands, by neck 132 and handlebar stem 112. Referring to FIG. 7, rear wheel assembly 150 is swung downward and forward about rearward hinge coupling 144 with the assistance of gravity in the orientation indicated by arrow 802 toward central frame assembly 140. As rear wheel 154 comes into contact with platform 148, the contact force will push platform 148 to swivel upward at platform hinge 149 about a horizontal axis parallel with the rear vertical longitudinal plane, reminiscent of opening a hatch door.

Figure 8:
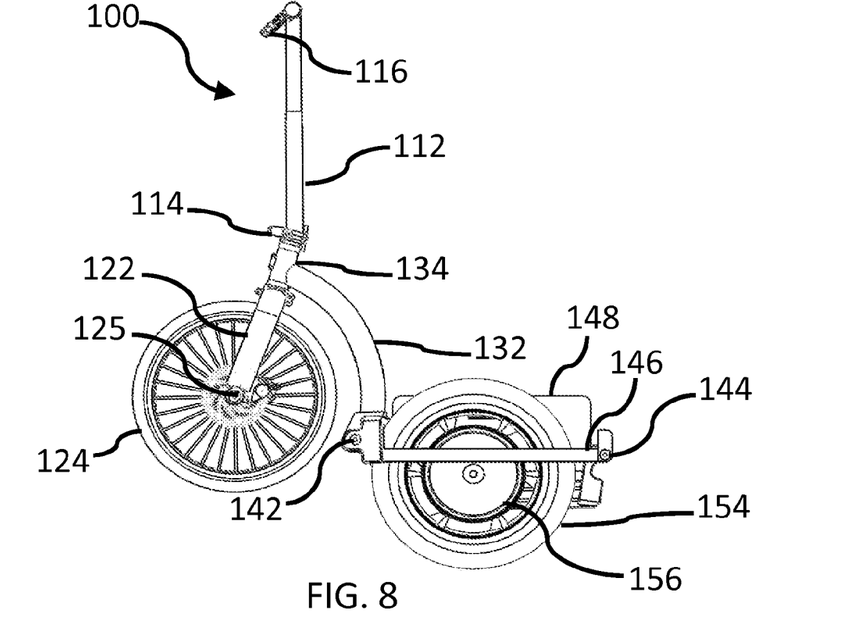
FIG. 8 illustrates a left side view of a step of an example folding process with a rear wheel assembly in an example folded position.

Referring to FIG. 8, swiveling upward of platform 148 allows rear wheel 154 to be disposed in a central space nestled between opposite branches of base frame 146. In this configuration, swiveled platform 148 lies alongside pivoted rear wheel 154. Having completed a first phase of folding scooter 100 into a compact arrangement suitable for transportation and storage, a user may choose to lock rearward hinge coupling 144 against pivoting to eliminate any interference during further phases of folding.

Figure 9:
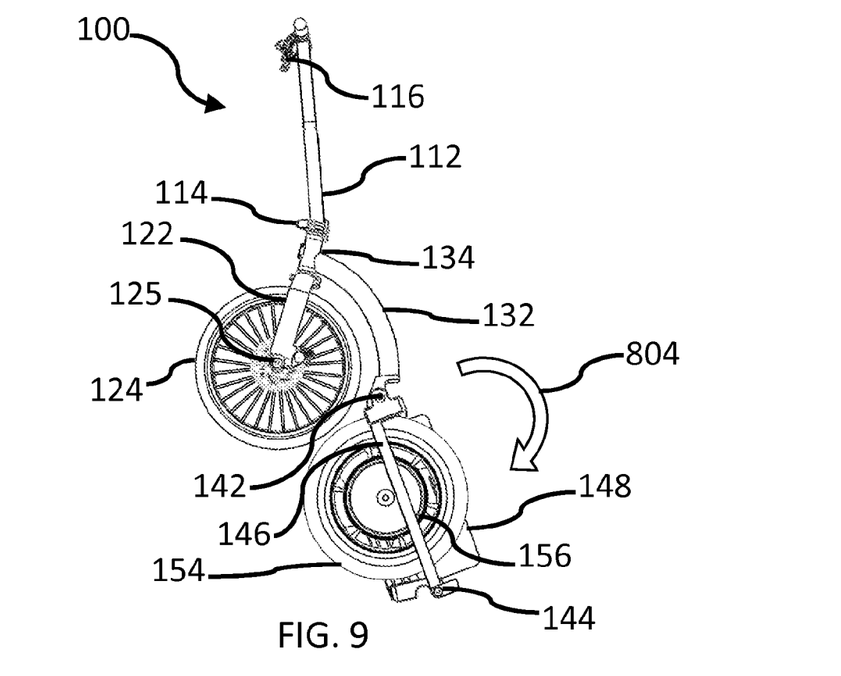
FIG. 9 illustrates a left side view of an example folding action of a vehicle in which a folded rear wheel assembly and a central frame assembly pivot downward and forward toward a front wheel assembly.

Referring to FIG. 9, forward hinge coupling 142 is unfastened to allow relative pivoting of central frame assembly 140 and front frame assembly 130, and again the scooter is lifted up. In an example, scooter 100 is lifted up with two hands by neck 132 and handlebar stem 112. Gravity will facilitate swinging of central frame assembly 140 together with folded rear wheel assembly 150 downward and forward in the orientation indicated by arrow 804 toward front wheel assembly 120.

Figure 10:
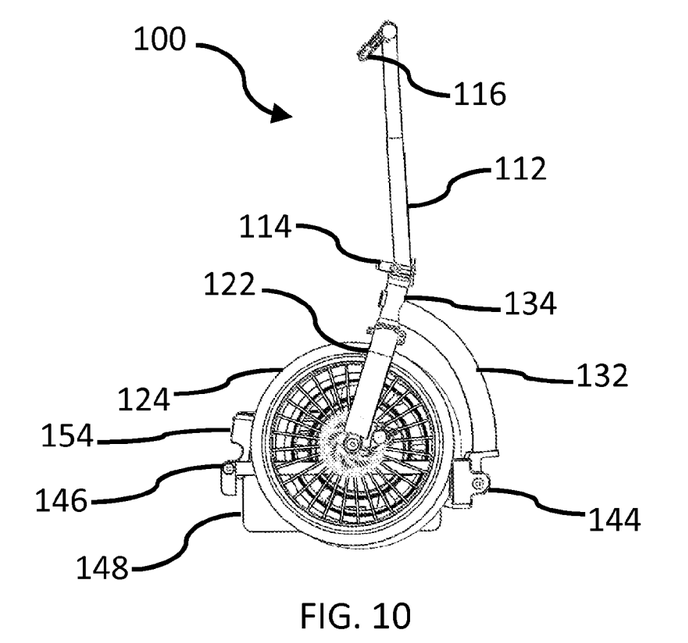
FIG. 10 illustrates a left side view of a step of an example folding process with a rear wheel assembly and a central frame assembly in a folded position alongside and proximal to a front wheel.
Figure 14:
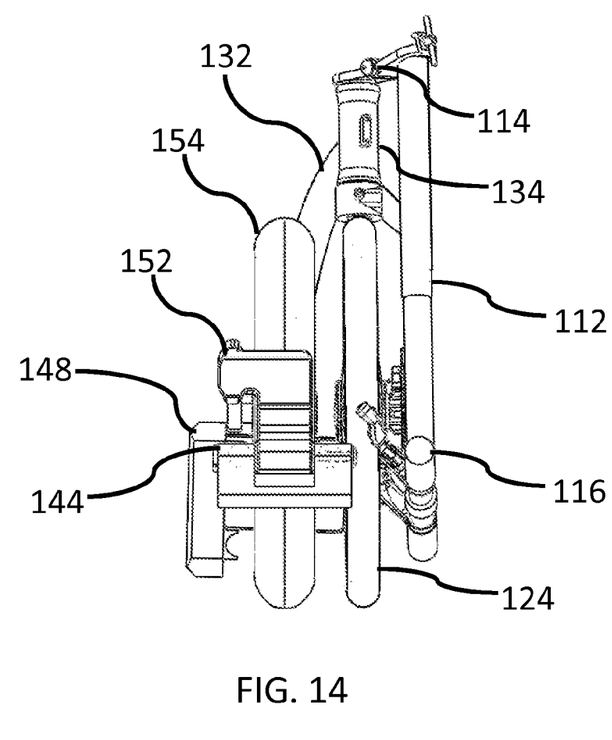
FIG. 14 illustrates a front view of a vehicle in an example fully folded arrangement.
Figure 15:
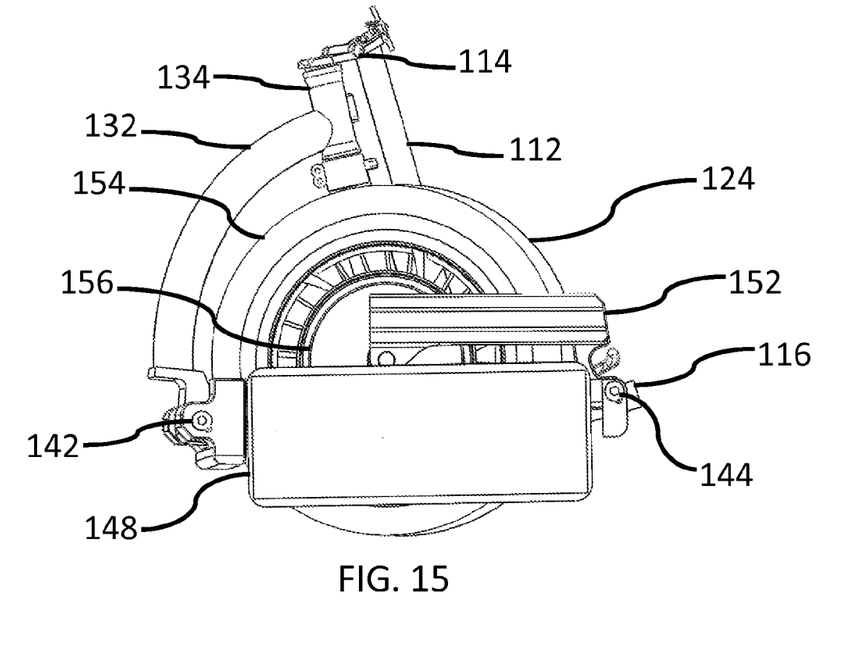
FIG. 15 illustrates a right side elevation view of a vehicle in an example fully folded arrangement.

While central frame assembly 140 and folded rear wheel assembly 150 are swung downward and forward, the skewed nature of forward hinge coupling 142 (refer to angles 301 and 302 of FIGS. 3 & 4) causes rear wheel assembly 150 and central frame assembly 140 to be progressively displaced laterally (FIGS. 9 & 10). This lateral displacement avoids interference of either central frame assembly 140 or rear wheel assembly 150 with front wheel assembly 120. When both rear wheel assembly 150 and central frame assembly 140 are in the completely folded configuration, the perpendicular distance between front wheel axle 125 and rear wheel axle 155 is less than the radius of front wheel 124 plus the radius of rear wheel 154 such that front wheel 124 overlaps rear wheel 154 in a side elevation view (FIG. 10). Furthermore, axles 125 and 155 are horizontal and substantially parallel and may be substantially aligned or co-linear while the front and rear vertical longitudinal planes are substantially parallel to each other and spaced apart (FIGS. 12-14). At this stage, a user may choose to lock forward hinge coupling142 against pivoting to eliminate any interference during further folding.

Figure 11:
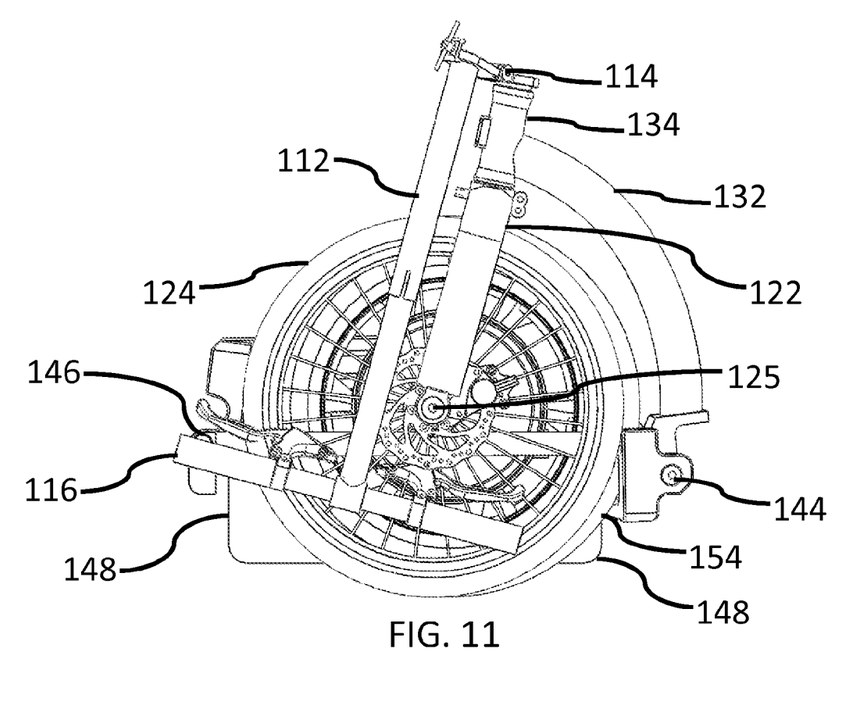
FIG. 11 illustrates a left side view of an example vehicle a handlebar and a handlebar stem in a folded position alongside a front wheel opposite a rear wheel assembly and a central frame assembly.

Referring to FIGS. 10 & 11, steering hinge 114 may be unfastened to allow the upper portion of steering assembly 110 to be folded downward toward front wheel assembly 120. In the folded arrangement, handlebar stem 112 is positioned substantially parallel to and closely spaced from front wheel carrier 122 and handlebar 116 lies adjacent to front wheel 124 at an angle substantially perpendicular to front wheel carrier 122 (FIG. 11). Additionally, in the folded arrangement, handlebar 116 and handlebar stem 112 lie in a plane substantially parallel with the front vertical longitudinal plane of front wheel 124 (FIG. 13).

With the folding of rearward hinge coupling 144, forward hinge coupling 142 and steering hinge 114 complete, steering hinge 114 along with any hinge coupling not previously locked, may be secured against pivoting thereby maintaining the vehicle in the folded arrangement.

In the folded arrangement, a portion of rear wheel 154 is disposed between the opposite branches of base frame 146 with its vertical longitudinal plane parallel with the platform hinge pivot axis (FIGS. 7-9 & 12-14) and is positioned between platform 148 and front wheel 124 (FIGS. 12-14).

It should be noted that folding actions described above may be performed in a different order, some actions may be eliminated or some actions may be added.

Return of the vehicle to the expanded, riding arrangement may be achieved by reversing the folding actions and re-securing all hinges and fastening devices. Both folding and unfolding of the vehicle are thus accomplished quickly and easily.

Head tube 134, neck 132, front wheel carrier 122, rear wheel carrier 152, handlebar 116 and handlebar stem 112 as well as base frame 146 may be formed of any suitable durable and lightweight materials including but not limited to hollow metal, or plastic or composite tubes. Platform 148 may be formed of similar durable and lightweight materials to provide a hollow, rectangular prism suitable for housing a motor controller and power source, as mentioned above. Solid rubber or pneumatic tires may be provided to front and rear wheels 124 and 154.

As an example, wheels 124 and 154 may be about 40 cm, but wheels of smaller or larger diameter may also be suitable. The top of platform 148 may be approximately 25 cm high with scooter 100 in the expanded arrangement and resting with wheels 123 and 154 on the ground. In example embodiments, the top of platform 148 may vary between approximately 20 cm high and approximately 30 cm high.

To increase adjustability of the height of handlebar 116, a telescoping handlebar stem 112 may be provided.

Example embodiments depicted in the present drawings employ a one-sided front wheel carrier 124 and a one-sided rear wheel carrier 152 so as to decrease the thickness of the folded scooter. However, in some circumstances, it may also be desirable to use a front wheel carrier 122 having two fork legs, a rear wheel carrier 152 having two fork legs, or both. Fork legs may affect the width of the folded package.

While disclosed as being housed in platform 148, the battery and motor controller may be provided, for example, in or on rear wheel carrier 152, neck 132, handlebar stem 112, or front wheel carrier 122.

While disclosed as being housed in hub 156 of rear wheel 154, the electric motor may also be housed in a hub of front wheel 124. In one example, a motor may be provided to both wheels 124 and 154.

In another example, a scooter may be constructed to exclude electrical and power components to yield an embodiment of a vehicle provided for manual operation. Elimination of electrical components does not affect the folding functionality of the scooter.

While the disclosure has been presented with respect to certain specific embodiments, it will be appreciated that many modifications and changes may be made by those skilled in the art without departing from the spirit and scope of the disclosure. It is intended, therefore, by the appended claims to cover all such modifications and changes as fall within the true spirit and scope of the disclosure.

What is claimed is:

1. A scooter configured for conversion between expanded and folded arrangements, comprising:
   a front frame assembly including a neck and a head tube configured to receive a handlebar stem;
   a front wheel carrier rotatably coupled with the head tube;
   a front wheel coupled with the front wheel carrier and including a circumference defining a front vertical longitudinal plane and an axle defining a front vertical transverse plane orthogonal to the front vertical longitudinal plane;
   a rear wheel assembly including a rear wheel carrier;
   a rear wheel coupled with the rear wheel carrier and including a circumference defining a rear vertical longitudinal plane and an axle defining a rear vertical transverse plane orthogonal to the rear vertical longitudinal plane;
   an electric hub motor operatively coupled with the rear wheel;
   a central frame assembly extending between the front frame assembly and the rear wheel assembly;
   a forward hinge coupling enabling relative pivoting of the front frame assembly and the central frame assembly about a front frame pivot axis extending at an acute angle relative to the rear vertical transverse plane and at an acute angle relative to a horizontal plane orthogonal to both the rear vertical longitudinal and rear vertical transverse planes;
   a rearward hinge coupling enabling relative pivoting of the central frame assembly and rear wheel assembly; and
   a steering assembly configured to enable steering of the front wheel and including a handlebar and a handlebar stem including an upper portion configured for clamping to the handlebar and a lower portion configured for receipt within the head tube;
   wherein the steering assembly further comprises a steering hinge configured to allow pivoting of the handlebar stem upper portion relative to the handlebar stem lower portion; and
   wherein the front vertical longitudinal plane and the rear vertical longitudinal plane are spaced apart and parallel, in the folded arrangement.

2. A vehicle configured for conversion between expanded and folded arrangements, comprising:
   a front frame assembly including a neck and a head tube configured to receive a handlebar stem;
   a front wheel carrier rotatably coupled with the head tube;
   a front wheel coupled with the front wheel carrier and including a circumference defining a front vertical longitudinal plane and an axle defining a front vertical transverse plane orthogonal to the front vertical longitudinal plane;
   a rear wheel assembly including a rear wheel carrier;
   a rear wheel coupled with the rear wheel carrier and including a circumference defining a rear vertical longitudinal plane and an axle defining a rear vertical transverse plane orthogonal to the rear vertical longitudinal plane;
   a central frame assembly extending between the front frame assembly and the rear wheel assembly;
   a forward hinge coupling enabling relative pivoting of the front frame assembly and the central frame assembly about a front frame pivot axis extending at an acute angle relative to the rear vertical transverse plane and at an acute angle relative to a horizontal plane orthogonal to both the rear vertical longitudinal and rear vertical transverse planes; and
   a rearward hinge coupling enabling relative pivoting of the central frame assembly and rear wheel assembly; and wherein the front vertical longitudinal plane and the rear vertical longitudinal plane are substantially coplanar with the vehicle in the expanded arrangement and the front wheel directed straight ahead and are spaced apart and substantially parallel in the folded arrangement.

3. The vehicle as set forth in claim 2, further comprising a steering assembly configured to enable steering of the front wheel and including a handlebar and a handlebar stem including an upper portion configured for clamping to the handlebar and a lower portion configured for receipt within the head tube.

4. The vehicle as set forth in claim 3, wherein the steering assembly further comprises a steering hinge configured to allow pivoting of the handlebar stem upper portion relative to the handlebar stem lower portion.

5. The vehicle as set forth in claim 4, wherein the pivot axis of the steering hinge extends at an angle of approximately 45 degrees relative to front vertical longitudinal plane.

6. The vehicle as set forth in claim 2, wherein the central frame assembly further comprises a platform supported by a base frame having opposite branches and wherein, in the folded arrangement, a portion of the rear wheel is disposed between the opposite branches of the base frame.

7. The vehicle as set forth in claim 6, wherein a top surface of the platform is substantially orthogonal to both the rear vertical transverse and rear vertical longitudinal planes in the expanded arrangement and substantially parallel with the rear vertical longitudinal plane in the folded arrangement.

8. The vehicle as set forth in claim 6, wherein in the folded arrangement, the rear wheel is positioned between the platform and the front wheel.

9. The vehicle as set forth in claim 6, wherein the platform is pivotably coupled to the base frame by a platform hinge.

10. The vehicle as set forth in claim 9, wherein the pivot axis of the platform hinge is substantially horizontal and parallel with the rear vertical longitudinal plane.

11. The vehicle as set forth in claim 10, wherein, with the vehicle in the folded arrangement, the rear wheel extends through the base frame with its vertical longitudinal plane parallel with the platform hinge pivot axis.

12. A vehicle configured for conversion between expanded and folded arrangements, comprising:
    a front frame assembly including a neck extending from a forward hinge coupling to a head tube configured to receive a handlebar stem;
    a front wheel coupled with the head tube through a front wheel carrier;
    a central frame assembly extending from the forward hinge coupling to a rearward hinge coupling; and
    a rear wheel coupled with the rearward hinge coupling through a rear wheel carrier;
    wherein the forward hinge coupling enables downward and sideways pivoting of the front frame assembly relative to the central frame assembly when the central frame assembly is lifted upward; and
    wherein, by the rearward hinge coupling, relative pivoting of the central frame assembly and rear wheel assembly is enabled about a rearward hinge pivot axis which is parallel to an axle of the rear wheel;
    wherein a front vertical longitudinal plane defined by a circumference of the front wheel and a rear vertical longitudinal plane defined by a circumference of the rear wheel are spaced apart and parallel in the folded arrangement; and
    wherein, in the folded arrangement, the front wheel overlaps the rear wheel when viewed in side elevation.

13. The vehicle as set forth in claim 12, wherein the central frame assembly further comprises a platform supported by a base frame having opposite branches and wherein, in the folded arrangement, a portion of the rear wheel is disposed between the opposite branches of base frame.

14. The vehicle as set forth in claim 13, wherein in the folded arrangement, the rear wheel is positioned between the platform and the front wheel.

15. The vehicle as set forth in claim 13, further comprising a platform hinge pivotably coupling the platform to the base frame along one of the opposite branches.

16. The vehicle as set forth in claim 12, wherein, with the vehicle in the folded arrangement, the handlebar stem is closely spaced from and substantially parallel to the front wheel carrier.

17. The vehicle as set forth in claim 12, wherein, with the vehicle in the folded arrangement, the handlebar lies adjacent to the front wheel at an angle substantially perpendicular to the front wheel carrier.

18. A vehicle configured for conversion between expanded and folded arrangements, comprising:
    a front frame assembly including a neck extending from a forward hinge coupling to a head tube configured to receive a handlebar stem;
    a front wheel coupled with the head tube through a front wheel carrier;
    a central frame assembly extending from the forward hinge coupling to a rearward hinge coupling, and including a base frame and a platform;
    a platform hinge pivotably coupling the platform to the base frame;
    a rear wheel coupled with the rearward hinge coupling through a rear wheel carrier;
    wherein, the rearward hinge coupling enables pivoting of the rear wheel assembly relative to the central frame assembly about a rearward hinge pivot axis; and
    wherein the forward hinge coupling enables pivoting of the front frame assembly relative to the central frame assembly about a forward hinge pivot axis which extends at an angle to the rearward hinge pivot axis;
    wherein the platform is horizontal in the expanded arrangement;
    wherein a front vertical longitudinal plane defined by a circumference of the front wheel, a rear vertical longitudinal plane defined by a circumference of the rear wheel, and a top surface of the platform are spaced apart and parallel in the folded arrangement; and
    wherein, in the folded arrangement, the platform, the front wheel and the rear wheel mutually overlap when viewed in side elevation.

* * * * *